(12) United States Patent
Eggers et al.

(10) Patent No.: US 6,598,158 B1
(45) Date of Patent: Jul. 22, 2003

(54) COMPUTER SYSTEM

(75) Inventors: Harald Eggers, Vierkirchen (DE);
Richard Schlag, Germering (DE);
Wolfgang Bauer, Inning (DE);
Manfred Schmelz, Unterhaching (DE);
Jürgen Niessen, Bad Heilbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,184

(22) PCT Filed: Jul. 21, 1998

(86) PCT No.: PCT/EP98/04557
§ 371 (c)(1),
(2), (4) Date: Jan. 4, 2000

(87) PCT Pub. No.: WO99/05596
PCT Pub. Date: Feb. 4, 1999

(30) Foreign Application Priority Data

Jul. 23, 1997 (DE) .......................................... 971 12 696

(51) Int. Cl.⁷ ............................................ G06F 15/177
(52) U.S. Cl. .............................. 713/2; 713/2; 713/100; 714/38
(58) Field of Search ................................ 713/2; 714/38

(56) References Cited

U.S. PATENT DOCUMENTS

| | | | | |
|---|---|---|---|---|
| 5,276,863 A | * | 1/1994 | Heider | 395/575 |
| 5,455,940 A | * | 10/1995 | Daniel et al. | 395/182.02 |
| 5,491,788 A | * | 2/1996 | Cepulis et al. | 395/182.11 |
| 6,279,120 B1 | * | 8/2001 | Lautenbach-Lampe et al. | 714/15 |
| 6,381,694 B1 | * | 4/2002 | Yen | 713/2 |

FOREIGN PATENT DOCUMENTS

WO   WO 95/22794   8/1995

* cited by examiner

Primary Examiner—Dennis M. Butler
Assistant Examiner—Nitin C. Patel
(74) Attorney, Agent, or Firm—McCormick, Paulding & Huber LLP

(57) ABSTRACT

In switching systems, automatic restarts of parts of the system or of the entire system are used for neutralizing software errors. Given an error that is hard to reproduce, the error cannot be neutralized by the above mechanism. This problem is solved by a restart mechanism that only restarts that software of the computer system that allows a continuation of operations of the computer system with reduced functionality.

5 Claims, 1 Drawing Sheet

COMPUTER SYSTEM

BACKGROUND OF THE INVENTION

In computer systems, particularly in real-time systems such as, for example, switching systems of telecommunications technology, software maintenance mechanisms are integrated in a standard way that offer techniques for neutralizing software errors.

These techniques are automatic restarts of parts or of the entire system, whereby data, operating means, operating system resources and the code part of the software (SF) themselves are reset graduated and re-initialized.

Automatic restart, techniques are generally graduated as follows:
1. Restart of an individual SW process or of a group of processes with initialization of its local data.
2. Restart of all processes of a processor (in multi-processor systems) with initialization of global data.
3. Synchronized start of all SW processes of a processor.
4. System-wide restarts with synchronized commissioning of all processors.
5. System-wide restarts with synchronized commissioning of all processors and loading of data and code.
6. System-wide restarts with synchronized commissioning of all processors connected with a fall-back to an earlier startup-tested SW generation in the overall system.

Errors are thereby currently neutralized in that, as a result of the initialization of data and the multiple program statuses that derive from the code with the corresponding data, that system constellation (data and code) that led to the error no longer occurs in purely statistical terms over the mid-term (i.e. until the correction of the SW error in the field, for example with PATCH, which was prepared in the laboratory.

This method fundamentally contains a critical deficiency: given serious errors, an escalation (expansion of the restart) to a system-wide startup level always occurs, whereby the entire SW is generally restarted. I.e., the faulty SW continues to be contained in the system and is also dynamically active. When it is a matter of an error that is hard to reproduce, then the error cannot be neutralized by the above mechanism. When the error is likewise already present in the earlier fall-back generation, then the system rolls and does not return into an active condition of its own power.

SUMMARY OF THE INVENTION

It is an object of the invention to avoid or diminish the previously noted disadvantages.

According to the present invention, in a computer system, a restart component is provided that only restarts software that allows a continuation of operation of the computer system with reduced functionality.

Also according to the invention, in a computer system a restart mechanism is provided that, given occurrence of an error during normal operation, initially attempts at least one time to reconvert a computer system into normal operation and, when this miscarries or the normal operation does not remain stable, implements a restart technique that only restarts software of the computer system that allows a continuation of operation of the computer system which reduce functionality.

With the computer system of the invention, in a computer system there is the improvement of a division into shells around a core. The core comprises a hardware of the computer system as well as software functions that are required for a basic operation of the system. At least one further shell is arranged around the core that comprises further software functions that are required for an expanded operation of the system. A restart mechanism controls the restart, this restart mechanism initially attempting at least once to activate the core in all shells and, when an error reoccurs, repeats the restart or activation attempt upon omission of a respective outermost shell.

An exemplary embodiment of the invention is explained in greater with reference to the drawings

DESCRIPTION OF THE PREFERRED EMBODIMENTS

Figure 2:
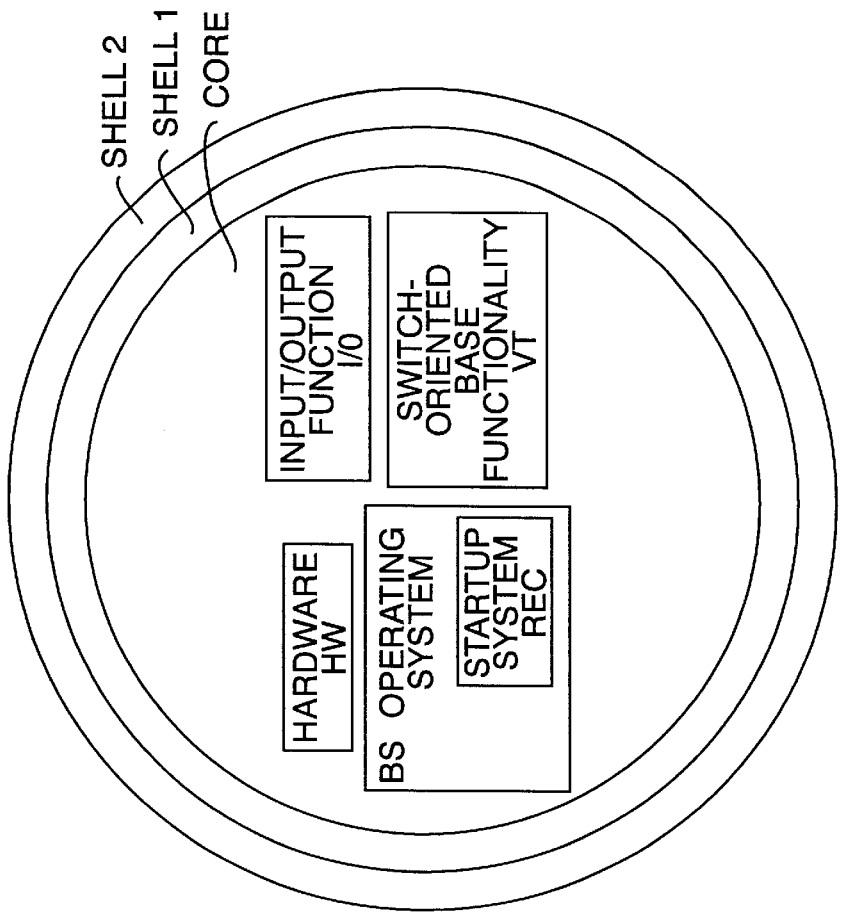
FIG. 2 shows the division of the switching system into shells around the core.

The components of the startup system that are automatically triggered via a statistical error evaluation are explained in greater detail below.

The startup techniques implemented by the components are divided into restarts NSTARTs and into initial starts INSTARTs. The NSTARTs in the central processor effect a resetting and restarting of all or/groups of SW processes. This occurs in two stages (NSTART0/1 and NSTART3), having different terms of the depth of the data initialization (see below)I. The initial starts reset the entire system and restart all processors.

A component or, startup unit RESTART0 (abbreviated: NSTART0) restarts all non-switching oriented processes in the coordination processor (CP) with initialization of the local data.

A component or, startup unit NSTART1 restarts all processes in the CP.

The component or, startup unit NSTART3 that additionally reloads semi-permanent data and code from the background memory and initializes trenchant data in the CP.

The component or, startup unit ISTART1 that additionally resets and reactivates the switching-oriented periphery.

The component or, startup unit ISTART2 (the most powerful startup unit in the current SW generation) additionally formats the main memory in the CP and reloads the switching-oriented periphery with data.

Up to this point, it is always the current system generation that is reloaded. When the error cannot be neutralized by this startup either, then a fall-back onto an earlier (code) generation occurs.

A component (ISTART2G), which loads a fall-back generation instead of the current generation, thus additionally loads the new code into the switching-oriented periphery.

There is then an error class that cannot be neutralized by this escalation mechanism: when the faulty SW is located both in the current as well as in the fallback SW generation and when this SW works with data that do not differ in the two generations, then this error is re-provoked given every new startup. Examples from the switching system EWSD are double disk errors, HW hardware errors and hard SW errors. The previous minimum in such situations with a fallback onto an earlier generation, if not a rolling start. Both have massive, negative influences on the operator (error-correction without indices in a stress situation given a rolling start, restoration of the current SW version with updating of the data base after a fallback onto an earlier SW generation).

The idea underlying the invention is that, given the occurrence of these errors, to remember the essence of a telecommunication system: the original function of a switching computer is to switch calls and transmit data.

Based on this idea, an automatic restart unit or, restart technique is initiated that only restarts SW relevant in terms of switching-oriented terms. The faulty SW will thereby be blanked out with high probability.

Considered in greater detail, a start-up unit, following the first initial start of the system (runup into normal operation), is embedded into the escalation mechanism such that, given recognition of an error during normal operation, at least one restart is automatically implemented, this initially attempting to return the computer system into normal operation and—only when this miscarries (or the normal operation does not remain stable)—the runup in the inventive mode occurs, which is henceforth named "switching-oriented base mode". The corresponding components or startup unit is called ISTART1B. In this startup, only those SW functions that have switching-oriented relevancy are started. The system is thus not converted into the normal operation but into a condition of reduced functionality.

Due to the intentional embedding of this startup unit into the escalation mechanism, namely sequentially preceding a startup unit having memory formatting, this mechanism also offers an effective technique against double disk outages in the system: only the part of the SW located in the memory that is relevant to switching-oriented tasks is restarted without having to reload SW and Init data from the disk. In this case, a fallback is made onto a restart unit that does not overwrite the current data with initial values. The corresponding component or, startup unit is called NSTART1B.

FIG. 2 shows the division of the switching system into shells around a core.

Figure 1:
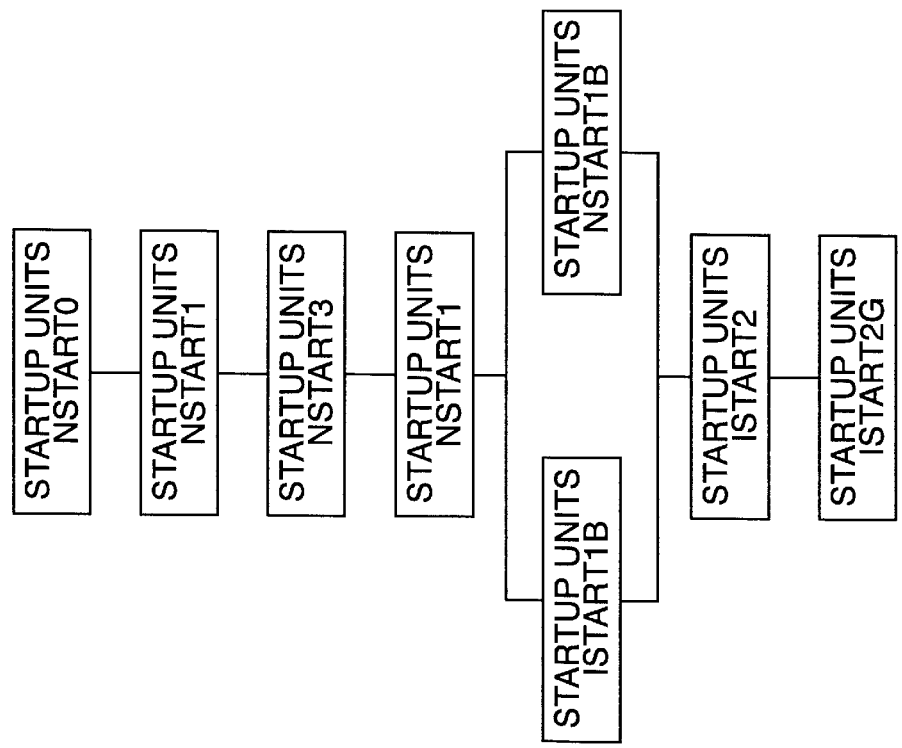
FIG. 1 shows the startup system that is realized in the electronic digital switching system EWSD of Siemens AG.

The core contains basic input/output functions I/O, switching-oriented processes with switching-oriented base functionality VT and the operating system BS with a startup system REC, which was already set forth in greater detail on the basis of FIG. 1. For example, alarming in the maintenance center or charging with AMA (automatic message counting) lie in a first shell around the core functions. Functions are arranged in a second shell that are in fact responsible for specific, switching-oriented special tasks but that can be omitted without great limitation for operators and ultimate consumers (for example, operator service functions and audits).

In a first attempt, the core and both shells are activated. When an error reoccurs statistically within the escalation monitoring, then the startup is repeated upon omission of the respective outer shell. When this also does not function, then the error lies within the core functions. The next step in the escalation must then be undertaken. The step-by-step fallback onto the different shells respectively occurs with a new start INSTART1B, with respectively further reductions of the process amount to be activated.

Since the switching system EWSD is a matter of a multi-processor system, the restart technique can be implemented both processor individually as well as system-wide.

Further essential functions that are relevant in conjunction with the restart technique are the alarming, the securing of indices, the debugging and the return into normal operation.

The alarming makes it possible for the operator to recognize and evaluate the limited system functionality, i.e. the basic switching-oriented operation.

The indices securing offers critical information for debugging (for example, a basic mode status statement, information about the causative SW errors, a runup accounting over the periphery, etc.). This information is output both at the local operating device (while by passing the standard output routes) as well as in the maintenance center. Likewise, sub-system outages during the status "basic switching-oriented operation" are output with the indices securing.

The debugging makes mechanisms available that, on the one hand, allow the error situation to be analyzed (in the running/active system). Second, it offers the operator a functionality for correcting SW errors in the system (standard during normal operation) that is automatically offered in the background as soon as it is requested by the operator. I.e., the SW error can be corrected in ongoing operation of the system in the reduced functionality.

With the beginning of the debugging, the SW status activated in the basic operation is "frozen in". I.e, when a further error occurs during the debugging, then the condition set before the beginning of the debugging is restored with a new start (ISTART1B or NSTART1B), since the newly occurring SW error can be attributed to the debugging techniques with high probability.

Finally, a return is present that restores normal operation. This is usually one of the initially cited, standard, available start techniques that must be manually triggered for this purpose.

Advantages of the invention for the operator and customers of the operator are explained in greater detail below.

Typically, approximately 50% to 80% of the SW in the controlling computer can be currently omitted without significantly limiting the service of a switching system vis a vis the final consumer. Approximately 50% to 80% of all SW errors that are not covered by standard techniques can thus also be neutralized in that the corresponding SW is no longer activated in this startup unit. The relationship will become even better in the future since the proportion of non-call-processing SW increases faster given further maturity and sophistication of a switching system than does the proportion of call-processing SW.

A further point must be noted:

The error probability is not equally distributed in the SW. The approximately 20% of the SW relevant in switching-oriented terms is error-free far, far faster since it is run with every switching setup and only a few special cases must be governed. The other 80% is run far more seldom, must govern significantly more complex error cases (for example, handling of multiple errors in the system) and therefore also contain a higher percentage of residual errors when the SW is delivered to the customer.

The system availability has noticeably improved with the introduction of these features in EWSD. The total system downtime, i.e. the time wherein the system is not available, would be approximately 50% higher without the switching-oriented basic operation. Specifically, the TSDT without switching-oriented basic operation would currently amount to 1.5 minutes/VST/year; with switching-oriented basic operation, it amounts to less then 1 min/VST/year.

A further gain for the operator derives by avoiding a fallback onto an earlier SW generation. The extremely complex, time-consuming roll forward onto the current generation is thus eliminated. At the same time, the loss of revenue caused by the roll forward is also eliminated for the operator.

A rolling recovery is avoided, i.e. the switching system is available to the telephone customers for standard jobs (telephoning, emergency call and service).

The elimination of the error is no longer time-critical. It can thus occur during normal working time with the assistance of the manufacturer (technical personnel in development). There are examples from the field where the switching-oriented basic operation occurred on Sunday but the error elimination was not implemented until Monday.

Although various minor changes and modifications might be proposed by those skilled in the art, it will be understood that our wish is to include within the claims of the patent warranted hereon all such changes and modifications as reasonably come within our contribution to the art.

What is claimed is:

1. A real time system comprising:

an operating system, an application system with at least one application, a restarting system, that, upon the appearance of a fault during normal operation of the real time system attempts, at least once, to return the real time system to normal operation; and wherein upon failure of the restarting system to return the real time system to normal, or if renewed normal operation does not remain stable, the restarting system carries out a new start up measure, in real time, and without any interruption in basic operation of the real time system, with a functionally reduced form of the application system, thereby making continued operation of the real time system with reduced functionality of the application system possible.

2. A real time system according to claim 1, wherein the attempt, at least once, to return the real time system to normal operation is successful.

3. A real time system according to claim 1, wherein the real time system includes a multi-processor system which carries out said restarting startup measure system-wide, or on individual processors.

4. A real time system according to claim 1 further including a suppressor component which makes available to the operator a functionality to correct SW-Faults during the operation with reduced functionality.

5. A real time system according to claim 1, wherein said system is associated with a communications switching system.

* * * * *

UNITED STATES PATENT AND TRADEMARK OFFICE
CERTIFICATE OF CORRECTION

PATENT NO. : 6,598,158 B1
DATED : July 22, 2003
INVENTOR(S) : Harald Eggers et al.

It is certified that error appears in the above-identified patent and that said Letters Patent is hereby corrected as shown below:

<u>Title page, Item [54] and Column 1, line 1,</u>
Title, please delete "COMPUTER SYSTEM", and replace with:

-- REAL TIME SYSTEM FOR AN AUTOMATIC RESTARTING IN A MINIMIZED/REDUCED FUNCTIONALITY AFTER FAILING TO RESTART PROPERLY UPON ENCOUNTERING FAILURE --

Signed and Sealed this

Second Day of March, 2004

JON W. DUDAS
*Acting Director of the United States Patent and Trademark Office*